(12) United States Patent
Visser et al.

(10) Patent No.: US 10,217,282 B2
(45) Date of Patent: Feb. 26, 2019

(54) AUTOMATIC MOVIE FLY-PATH CALCULATION

(75) Inventors: Cornelis Pieter Visser, Eindhoven (NL); Hubrecht Lambertus Tjalling De Bliek, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 270 days.

(21) Appl. No.: 12/739,967

(22) PCT Filed: Oct. 27, 2008

(86) PCT No.: PCT/IB2008/054429
§ 371 (c)(1),
(2), (4) Date: Apr. 27, 2010

(87) PCT Pub. No.: WO2009/057035
PCT Pub. Date: May 7, 2009

(65) Prior Publication Data
US 2010/0259542 A1 Oct. 14, 2010

(30) Foreign Application Priority Data
Nov. 2, 2007 (EP) ..................................... 07119906

(51) Int. Cl.
*G09G 5/00* (2006.01)
*G06T 19/00* (2011.01)

(52) U.S. Cl.
CPC .. *G06T 19/003* (2013.01); *G06T 2207/30048* (2013.01); *G06T 2210/41* (2013.01)

(58) Field of Classification Search
None
See application file for complete search history.

(56) References Cited

U.S. PATENT DOCUMENTS 4,736,436 A * 4/1988 Yasukawa ................ G06T 7/00
382/154
5,841,440 A * 11/1998 Guha .................. G06F 3/04815
345/419

(Continued)

FOREIGN PATENT DOCUMENTS

| WO | 9811524 A1 | 3/1998 |
| WO | 0041134 A1 | 7/2000 |
| WO | 2000055812 A1 | 9/2000 |

OTHER PUBLICATIONS

Wan et al., Automatic Centerline Extraction for Virtual Colonoscopy, Dec. 2002, IEEE Transaction on Medical Imaging, vol. 21, No. 12, pp. 1450-1460.*

(Continued)

*Primary Examiner* — Anh-Tuan V Nguyen

(57) ABSTRACT

Movies of volume rendered medical images, that give an impression of the anatomy, become more and more important, because this type of visualization comes close to reality. However it is time consuming to compose these movies, if another path than geometrical primitives (like a circle) is preferred. Besides this it is virtually impossible to reproduce comparable complex, manually composed, fly-paths. The proposed apparatus focuses on volume rendered movies of whole heart MR scans. It solves the problems mentioned above, by automatically deriving a fly-path from the segmentation data of the coronary arteries. A method, computer-readable medium and use are also provided.

14 Claims, 4 Drawing Sheets

(56) References Cited

U.S. PATENT DOCUMENTS

| | | | |
|---|---|---|---|
| 5,920,320 A * | 7/1999 | Shimizu | G06T 17/00 345/422 |
| 5,971,767 A | 10/1999 | Kaufman et al. | |
| 6,083,162 A * | 7/2000 | Vining | 600/407 |
| 6,222,549 B1 * | 4/2001 | Hoddie | G06T 15/00 345/419 |
| 6,343,936 B1 | 2/2002 | Kaufman et al. | |
| 6,389,179 B1 * | 5/2002 | Katayama | G06T 3/4038 348/36 |
| 6,642,922 B1 * | 11/2003 | Noda | B25J 9/1671 345/419 |
| 6,664,986 B1 * | 12/2003 | Kopelman | A61C 9/0046 345/653 |
| 6,864,886 B1 * | 3/2005 | Cavallaro | H04N 5/265 345/420 |
| 7,267,482 B2 | 9/2007 | Ohishi | |
| 7,324,104 B1 * | 1/2008 | Bitter | G06T 7/0081 345/419 |
| 7,796,790 B2 * | 9/2010 | McNutt | G06K 9/209 345/619 |
| 7,822,461 B2 * | 10/2010 | Geiger et al. | 600/415 |
| 2003/0011535 A1 * | 1/2003 | Kikuchi | G06T 15/10 345/6 |
| 2003/0069499 A1 * | 4/2003 | Lienard | A61B 6/481 600/431 |
| 2003/0103063 A1 * | 6/2003 | Mojaver | G06T 3/00 345/647 |
| 2003/0132936 A1 | 7/2003 | Kreeger et al. | |
| 2003/0189567 A1 * | 10/2003 | Baumberg | 345/419 |
| 2004/0082849 A1 * | 4/2004 | Schweikard | G06T 15/20 600/424 |
| 2004/0171922 A1 * | 9/2004 | Rouet | G06T 19/003 600/407 |
| 2005/0075167 A1 * | 4/2005 | Beaulieu | G07F 17/3211 463/32 |
| 2005/0107695 A1 * | 5/2005 | Kiraly | G06T 15/06 600/431 |
| 2005/0117787 A1 * | 6/2005 | Iordanescu et al. | 382/128 |
| 2005/0175234 A1 * | 8/2005 | Sakamoto | 382/154 |
| 2005/0195189 A1 * | 9/2005 | Raman | G06T 5/50 345/424 |
| 2005/0209525 A1 * | 9/2005 | Bojovic | A61B 5/04011 600/512 |
| 2006/0062450 A1 * | 3/2006 | Yoakum-Stover et al. | 382/154 |
| 2006/0120589 A1 * | 6/2006 | Hamanaka | 382/154 |
| 2006/0197780 A1 * | 9/2006 | Watkins | G06T 19/00 345/620 |
| 2007/0154075 A1 * | 7/2007 | Matsumoto | G06T 15/08 382/128 |
| 2007/0183685 A1 * | 8/2007 | Wada | G06K 9/32 382/285 |
| 2008/0069419 A1 * | 3/2008 | Farag | G06F 19/3437 382/131 |
| 2008/0074489 A1 * | 3/2008 | Zhang | G06T 3/4038 348/36 |
| 2008/0094358 A1 * | 4/2008 | Sullivan | G06T 3/20 345/161 |
| 2009/0002366 A1 * | 1/2009 | Kanitsar | A61B 6/032 345/419 |
| 2010/0259542 A1 | 10/2010 | Visser et al. | |

OTHER PUBLICATIONS

Weber et al., Whole-Heart Steady-State Free Precession Coronary Artery Magnetic Resonance Angiography, Nov. 2003, Magnetic Resonance in Medicine, vol. 50, No. 6, pp. 1223-1228.*

Paik et al: "Automated Flight Path Planning for Virtual Endoscopy"; Medical Physics, vol. 25, No. 5, May 1998, pp. 629-637.

Chiou et al: "An Interactive Fly-Path Planning Using Potential Fields and Cell Decomposition for Virtual Endoscopy"; IEEE Transactions on Nuclear Science, vol. 46, No. 4, Aug. 1999, pp. 1045-1049.

* cited by examiner

AUTOMATIC MOVIE FLY-PATH CALCULATION

FIELD OF THE INVENTION

This invention pertains in general to the field of medical imaging. More particularly the invention relates to automatic movie fly-path calculation in a medical image dataset.

BACKGROUND OF THE INVENTION

Movies of volume rendered medical images, that give an impression of the anatomy, become more and more important, because this type of visualization comes close to reality.

In cardiac imaging there is a desire to be able to visualize the coronary arteries of the heart in an acquired cardiac image dataset, for example to detect a stenosis in the coronary arteries. A cardiac image dataset may be obtained by performing a Magnetic Resonance Imaging (MRI) scan of a patient's heart. Once the scan is recorded it may for instance be visualized as a volume rendering, after applying proper classification and segmentation. By choosing different orientations of the camera of the volume rendered image, a sequence of images may be derived that form a movie.

Cardiologists welcome volume rendered images of the heart with coronaries, as this type of visualization resembles closely to what they will see, when they subsequently perform an operation on the patient. The natural way to inspect the coronaries is to view them one by one in the direction of the blood flow, starting at the aorta, moving downwards.

Currently it is virtually impossible to reproducibly compose comparable free-hand overview movies of a whole heart scan. The user selects certain so-called key images. These key images are images on the fly-path of the camera. Once the user has selected all the key images he likes, a fly-path is calculated by interpolating the geometrical properties of the key images; these are, origin in space, orientation in space and the zoom factor. Apart from these manually selected key images there also exist automatic fly-paths. However these paths are simple mathematical paths, such as e.g. a circle around the object. All images of the movie will have the same classification/opacity.

A shortcoming of the current solutions is that it is very time consuming to define the key images if another path than geometrical primitives, such as a circle, is preferred. Furthermore, it is virtually impossible to reproducibly define comparable complex, manually composed, fly-paths.

Hence, an apparatus, method, computer-readable medium and use allowing for increased flexibility and cost-effectiveness would be advantageous.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing an apparatus, a method, a computer-readable medium, and use according to the appended patent claims.

In an aspect of the invention an apparatus for processing of an image dataset comprising an object is provided. The apparatus comprises a segmentation unit configured to perform image segmentation of said object, a calculation unit configured to: calculate a first location defining a first start point of a first sub object of said object; calculate a second location defining an first end point of said first sub object; calculate a third location defining a center point of said image dataset; calculate a first projected start point by projecting said first start point onto a projection surface using said center point; calculate a first projected end point by projecting said first start point onto a projection surface using said center point; and calculate a path between said first projected start point and said first projected end point. The apparatus may also comprise a movie creation unit configured to calculate at least two successive images along said path, wherein each of said images has a projection plane defined by a predetermined relation to said path and center point.

In another aspect of the invention a method for processing of an image dataset comprising an object is provided. The method comprises performing image segmentation of said object, calculating a first location defining a first start point of a first sub object of said object, calculating a second location defining an first end point of said first sub object, calculating a third location defining a center point of said image dataset, calculating a first projected start point by projecting said first start point onto a projection surface using said center point, calculating a first projected end point by projecting said first start point onto a projection surface using said center point, calculating a path between said first projected start point and said first projected end point, and calculating at least two successive images along said path, wherein each of said images has a projection plane defined by a predetermined relation to said path and center point.

In yet another embodiment a computer-readable medium having embodied thereon a computer program for processing by a processor is provided. The computer program comprises a segmentation code segment configured to perform image segmentation of an object being comprised in an image dataset, a calculation code segment configured to: calculate a first location defining a first start point of a first sub object of said object; calculate a second location defining an first end point of said first sub object; calculate a third location defining a center point of said image dataset; calculate a first projected start point by projecting said first start point onto a projection surface using said center point; calculate a first projected end point (by projecting said first start point onto a projection surface using said center point; and calculate a path between said first projected start point and said first projected end point. The computer program may also comprise a movie creation code segment configured to calculate at least two successive images along said path, wherein each of said images has a projection plane defined by a predetermined relation to said path and center point.

In an aspect of the invention a use of the apparatus according to claim 1 for facilitating diagnosis or subsequent treatment or surgical treatment of an anatomical structure in a patient is provided.

The proposed method focuses on volume rendered movies of whole heart MR scans. It solves the problems mentioned above, by automatically deriving a fly-path from the segmentation data of the coronary arteries. As a result a natural looking fly-path may be calculated.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

Figure 1:
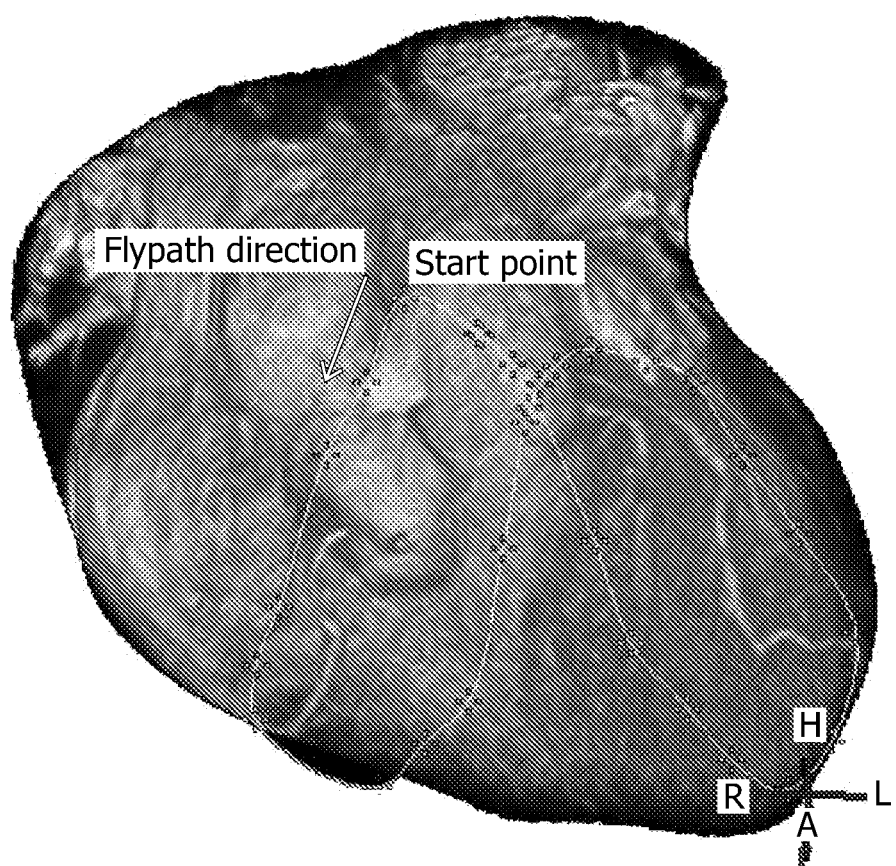
FIG. 1 is an illustration showing a volume rendered image of a heart and a preferred fly-path of the camera.

FIG. 1 illustrates a volume rendered image of the heart, in which a preferred fly-path of the camera is drawn on the surface of the volume rendered image according to prior art.

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention. The following description focuses on embodiments of the present invention applicable to the field of imaging for creating an automatic movie fly-path of an object comprised in an image dataset.

A main idea of the invention according to some embodiments is to provide an apparatus and method for automatically calculating a fly-path through an object, such as a heart, in an image dataset automatically.

In some embodiments the created fly-path movie is composed such, that it produces a closed fly-path, without any discontinuities. A benefit of this embodiment is that the movie may be played over and over again, without annoying jumps.

Figure 2:
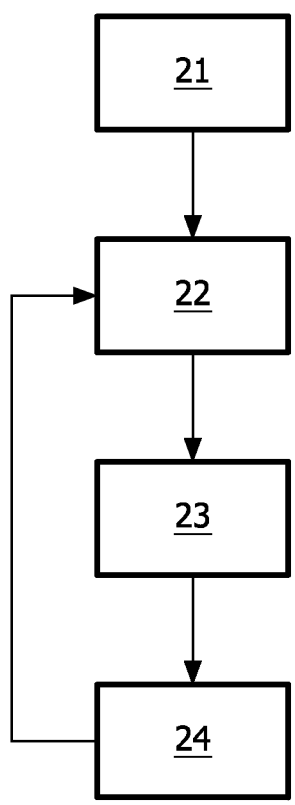
FIG. 2 is a block diagram showing an apparatus according to an embodiment.

In an embodiment, according to FIG. 2, an apparatus 20 is provided. The apparatus comprises a segmentation unit 21 for performing segmentation of an object of interest, such as coronary arteries, in an anatomical structure, such as a heart, in an image dataset such as a volumetric image dataset.

Any suitable commonly known image segmentation techniques may be used to perform the segmentation. The specific segmentation technique used in the apparatus may vary from time to time, depending on the object type, or e.g. as segmentation techniques constantly being improved. It should be appreciated that the invention according to some embodiments is not limited to a specific segmentation technique.

The apparatus may also comprise a calculation unit 22 for calculation of a first location defining a start point 31 of a first sub object, such as a first coronary artery.

In some embodiments a user may define the start point and end point or average end point of a sub object of interest by using a pointing device, such as a mouse by clicking, in the image dataset. By applying for instance a minimum cost algorithm, the centerline of the artery that connects these points may be found. Another known technique is clicking one point, the start point, from which a tree structure may grow in a preferred direction, which results in the centerline of a coronary artery with side branches. In both cases the start point that was clicked by the user in the segmentation step, may be used as the start position of the camera on the fly-path. Once the centerline is found, perpendicular to this centerline a ring algorithm may be applied to find the border of the sub object, e.g. artery, in each image dataset. Accordingly, the segmentation may contain a centerline with a start and end point (or multiple end points) and a collection of voxels, which describe the object or sub object.

Independently of the used segmentation techniques, the start point of the camera is identical to the projected start point of the segmented centerline of the sub object.

The calculation unit may also be configured to calculate a second location defining an end point 32 of the first sub object.

Moreover, the calculation unit 22 may be configured to calculate a third location defining a start point 33 of a second sub object, such as a second coronary artery. The calculation unit may also be configured to calculate a fourth location defining an end point 34 of the second sub object.

The calculation unit 22 may also be configured to calculate an intermediate point, e.g. located on the centerline of said sub object between the start point and end point. The calculation unit may calculate the location of the intermediate point along the centerline, e.g. using known image processing segmentation algorithms.

The calculation unit may also be configured to calculate a center point of the image dataset. The center point may e.g. be calculated such that it is located in the centre of the segmented objects.

Based on the calculated center point and the calculated points, i.e. start point, intermediate points, and end point, along the sub object, a camera fly path may be calculated. All points along the fly-path may have a defined distance to the center point.

Should the sub object comprise a split structure such as a tree structure the sub object consequently will have one end point for each branch. This is e.g. the case when the sub object is a coronary artery that has at least two end points since it splits. In this case the calculation unit 22 is configured to calculate one average endpoint for each sub object. Accordingly, one average end point for all calculated end points for each sub object may be calculated, e.g. by calculating a vector from the center point to each end point and subsequently average these vectors such that an averaged endpoint may be calculated.

Figure 3:
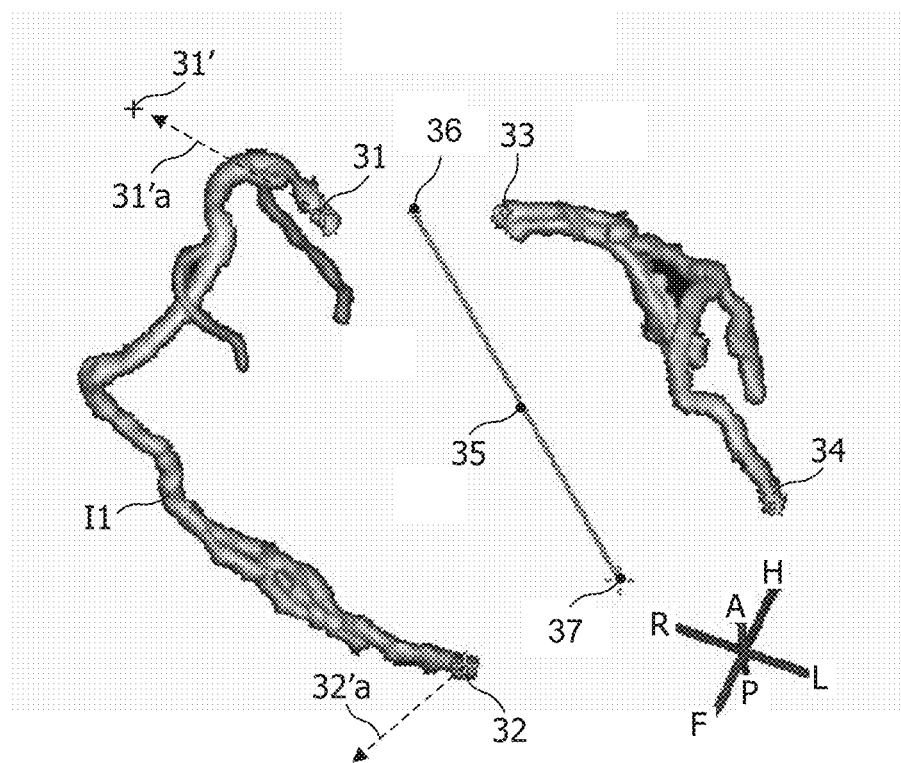
FIG. 3 is an illustration of segmented sub objects in an image dataset and points being used when calculating the fly-path according to an embodiment.

Based on the first, second, third, and fourth location the calculation unit may calculate an approximate direction of a long axis 35 as shown in FIG. 3, on which a center point is located, onto which the camera, such as virtual camera, may be pointed during the whole fly-path.

In FIG. 3 the calculated start and end points 31, 32, 33, 34 are illustrated in a segmented coronary image. The calculated approximate long axis between the points 36 and 37 is also illustrated, and point 35, which is the middle of this long axis. Points 31, 32, 33 and 34 are vectors in space. Point 35 may be calculated as follows:

[36]=([31]+[33])/2

[37]=([32]+[34])/2

[35]=([36]+[37])/2

Figure 4:
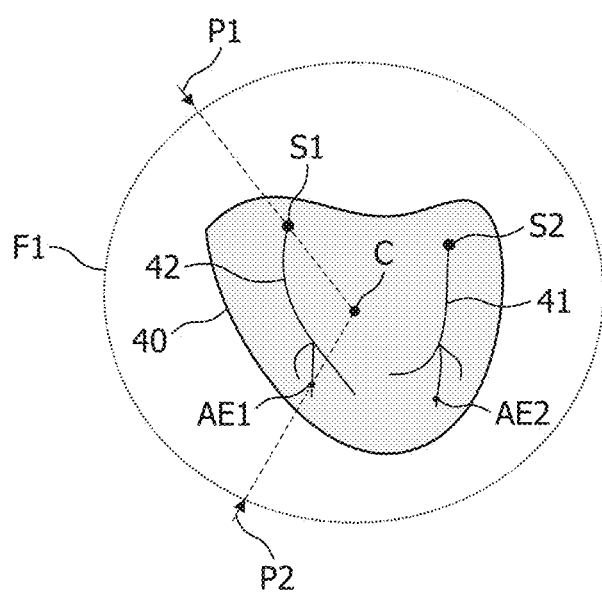
FIG. 4 is an illustration showing the fly-path around an object according to an embodiment.

FIG. 4 illustrates the fly-path around an object 40, which in this case is a heart, and two sub objects 41, 42 that represent the two coronary arteries of the heart. A start point S1, S2 and an average end point AE1, AE2 for each sub object may be observed. C indicates the center point. P1 indicates a vector that originates from the center point and passes the start point S1 in the sub object 41. P2 indicates a vector that originates from the center point and passes the end point S2 in the sub object 41. The camera fly path may be defined at a fixed distance, from the center point. Accordingly the camera fly-path may be illustrated as being located on the surface of a virtual sphere having a radius such that the whole heart fits inside this virtual sphere. The camera is on the surface of this virtual sphere and is always pointing in the direction of the center point. The coordinates of a point of the fly-path may be calculated utilizing a vector for each point along the sub object originating from the center point. The coordinate at which this vector intersects the surface of the virtual sphere will be a point of the fly path. Accordingly, the coordinate at which vector P1 intersects the surface of the virtual sphere will represent the start point of the fly-path. Similarly, the coordinate at which vector P2 intersects the surface of the virtual sphere will represent an end point of the fly-path. In this way the fly-path F1 may be calculated. Accordingly, the fly-path will be an arc on the surface of the virtual sphere.

In an embodiment the calculation unit is configured to project each start point S1, S2, end point E1, E2 or average end point AE1, AE2 onto the virtual sphere surface resulting in a set of projected points S1', S2', E1', E2', AE1', AE2'. The calculation may utilize the center point as reference, e.g. utilizing the vector from the center point passing through each calculated point to calculate the coordinate of the projected points. When the coordinates of the projected points is known, the fly-path may be calculated as the shortest path, i.e. an arc, between the projected points on the surface of the virtual sphere. In this way the fly-path will comprise a number of segments, wherein each segment represents an arc between two projected points on the virtual sphere surface.

For example, e.g. 4 segments may be provided:
1. From coronary 1 start S1 to coronary 1 end AE1
2. From coronary 1 end AE1 to coronary 2 start S2
3. From coronary 2 start S2 to coronary 2 end AE2; and
4. From coronary 2 end AE2 to coronary 1 start S1.

The resulting fly-path will thus constitute a closed loop path, as the end point of each segment is the start point of the following segment for all segments except the last segment, in which the end point is the start point of the first segment.

In an embodiment, the center point may be calculated using the start points s1 and s2, and end points e1 and e2. The focal point f of the camera may be calculated using:

$$f=(((s1+s2)/2)+((e1+e2)/2))/2$$

The focal point is the center point of the virtual sphere.

The apparatus 20 may also comprise a movie creation unit 23, which is configured to create a sequence of images, constituting a fly-path movie, following the calculated fly path.

The movie creation unit may calculate each image of said sequence of images based on the calculated fly-path and information regarding the orientation of the virtual camera along the fly-path.

In three dimensions the orientation of the virtual camera may be defined by rotation around three orthogonal axes. In an embodiment the camera plane is oriented such that it is pointing towards the center point. This means that the normal vector for any point, such as the middle point, on the camera plane will intersect with the center point.

Moreover, this means that two of the three rotational axes thus are fully defined by this relation. In an embodiment the remaining rotational axis may be calculated to have a certain rotational relation to the fly-path. This remaining axis may be interpreted to describe a horizon component of the orientation. The "horizon component of the orientation" of the camera is fixed for all images in each segment, but for each segment the camera has a different horizon component. The normal vector n of each plane, that is determined by the points S, AE and C, defines the horizon component of the orientation of the camera in this particular segment. This normal vector may be interpreted as being parallel to the horizon.

In this way the orientation may be fully defined by the normal vector as horizon and the direction vector, which is defined by the current position and the focus point, i.e. center point.

The orientation of the virtual camera may be such that the sub object is in a vertical position and the direction vector of the centerline of the sub object is parallel to the projection plane. For each point along the centerline an image may be registered by the virtual camera. Once the virtual camera has reached the end point 32 of the first sub object, its position may be automatically changed to the start point 33 of the second sub object, such as the main artery.

The virtual camera may follow the centerline of the second sub object. When the end point 34 of the second sub object is reached, the movie creation unit may create a closed fly-by movie based on each of the registered images along the centerline(s). Accordingly the motion creation unit is configured to create an image sequence based on successive images taken along the centerline. The movie creation unit 23 may interpolate the start point 33 of the second sub object with the end point of the first sub object, as well as interpolate the end point of the second sub object with the start point 31 of the first sub object to obtain closed fly-path.

The geometry of the camera may be described by three axes and an origin, which in mathematics is written as a matrix and an extent that describes the zoom factor. For example, two camera positions on the virtual sphere results in two matrices with known parameters. By interpolation, a camera matrix for each camera position between the two camera positions along the fly path may be calculated, e.g. by interpolating the parameters of the known camera matrices.

In some embodiments the movie creation unit may calculate n number of images on each arc segment that have an equal delta in orientation starting at the start image and ending at the end image. This may be repeated for each arc segment.

In some embodiments at least one intermediate point I1 located between the start point and end point of the sub object, e.g. along the centerline of the sub object, is used together with the start point and end point of the sub object and the center point to define a fly-path on the virtual sphere. The intermediate point may be projected onto the virtual sphere surface in the same way as the start or end point. Accordingly, the resulting fly-path from projected start point S1' to projected averaged end point AE'1 will comprise two arc segments, i.e. from S1' to I1' and from I1' to E1', as instead of one arc from S1' to AE1' directly.

By increasing the amount of intermediate points I1, I2, etc that are used in the calculation of the fly-path, the resulting image sequence may be experienced as being increasingly shaky. This shakiness is due to fact that the sub object, such as artery is not a perfect arc and accordingly this leads to increasing changes of the orientation of the camera when traveling from the start point to the end point of the sub object.

On the other hand the shortest arc defined by S, AE (and C) might not keep the sub object in the middle of the image. Accordingly, depending on the appearance of the sub object, a number of intermediate points may be chosen to be included in the calculation of the fly-path, in a way that the resulting image sequence is not experienced as shaky and at the same time the sub object is as close to the middle of each image in the image sequence as possible.

In some embodiments, one intermediate point located at the same distance between the start point and end point may be used in the calculation of the fly-path. In other embodiments two intermediate points, e.g. located ⅓ and ⅔ of the distance from the start point to the end point, may be used in the calculation of the camera fly-path.

In other embodiments any number of intermediate points may be used in the calculation of the camera fly-path.

Accordingly, the fly-path between a projected start point S1' and projected average end point AE1' of a sub object may either be a perfect arc defined by S1, AE1, and C or being composed out of sub segments that may have any resolution by computing the projection of n intermediate points of the sub object on the virtual sphere. An intermediate point may according to some embodiments be located on a straight line between the start point and the end point of a sub object.

An intermediate point may according to some embodiments be located on a straight line between any start point(s) and/or end point(s) of two different sub objects.

The intermediate points may be located on a straight line between the start point and end point of a sub object. The straight line may thus differ from the calculated centerline and its projection on the virtual sphere may bring a smoother character to the fly-path. The movie creation unit may then create a movie comprising registered virtual camera images taken along the interpolated line, instead of the centerline as mentioned in an embodiment above. As a result of letting the virtual camera follow the projection of the interpolated line the sub object, such as artery, may optionally not be in the center of each registered image anymore, but the resulting image sequence as a whole may be smoother than compared to the embodiment using the centerline or intermediate points along the centerline as a reference for the fly-path of the virtual camera.

In an embodiment the apparatus 20 moreover comprises an input unit 24 configured to receive input from a user, such as a radiologists or cardiologists, regarding a preferred fly-path differing from the automatically calculated movie fly-path. The calculation unit may be configured to calculate additional points from the user-defined fly-path in relation to the calculated start points 31, 33 and end points 32, 34 respectively. These additional points are located on the user-defined fly-path. The start points, end points, and additional points define the user defined fly path. The additional points are not stored as absolute coordinate values but are stored as relative positions with respect to the position of the calculated start and end points.

In some embodiments the calculation unit may utilize the calculated additional points for calculating a fly-path that deviates from the standard fly-path. For each new patient the fly-path will be based on the calculated start point(s) 31, 33 and end point(s) 32, 34 and points calculated from the additional points. The movie creation unit 23 then creates a movie utilizing images registered by the virtual camera along a line composed of the modified standard fly-path.

In some embodiments the segmentation unit 21, calculation unit 22, movie creation unit 23, or input unit 24 may be comprised into one integral, such as one unit.

Figure 5:
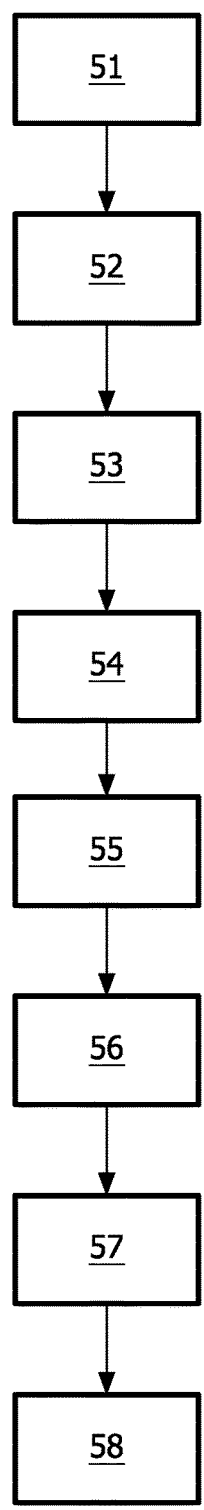
FIG. 5 is an illustration showing a method according to an embodiment.

In an embodiment, according to FIG. 5, a method for processing of an image dataset comprising an object is provided. The method comprises performing 51 image segmentation of said object. The method may also comprise calculating 52 a first location defining a first start point 31, S1 of a first sub object of said object. The method may also comprise calculating 53 a second location defining a first end point 32, E1, AE1 of said first sub object. The method may also comprise calculating 54 a third location defining a center point 35, C of said image dataset. The method may also comprise calculating 55 a first projected start point S1' by projecting said first start point onto a projection surface using said center point. The method may also comprise calculating 56 a first projected end point E1', AE1' by projecting said first start point onto a projection surface using said center point. The method may also comprise calculating 57 a path F1 between said first projected start point and said first projected end point. The method may also comprise calculating 58 at least two successive images along said path, wherein each of said images has a projection plane defined by a predetermined relation to said path and center point.

Figure 6:
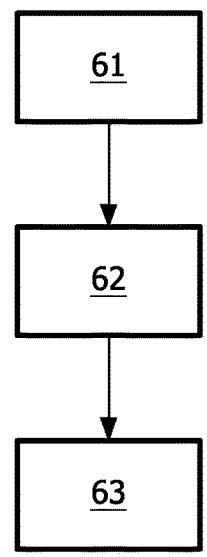
FIG. 6 is an illustration showing computer program according to an embodiment.

In an embodiment, according to FIG. 6, a computer-readable medium having embodied thereon a computer program for processing by a processor is provided. The computer program comprises a segmentation code segment 61 configured to perform image segmentation of an object being comprised in an image dataset, a calculation code segment 62 configured to calculate a first location defining a first start point 31, S1 of a first sub object of said object. The calculation code segment may also be configured to calculate a second location defining an first end point 32, E1, AE1 of said first sub object a third location defining a center point 35, C of said image dataset. The calculation code segment may also be configured to calculate a first projected start point S1' by projecting said first start point onto a projection surface using said center point, calculate a first projected end point E1', AE1' by projecting said first start point onto a projection surface using said center point. The calculation code segment may also be configured to calculate a path F1 between said first projected start point and said first projected end point. The computer program may also comprise a movie creation code segment 63 configured to calculate at least two successive images along said path, wherein each of said images has a projection plane defined by a predetermined relation to said path and center point.

In an embodiment a use of the apparatus, method, or computer program for facilitating diagnosis or subsequent treatment or surgical treatment of an anatomical structure in a patient is provided.

Applications and use of the above-described embodiments according to the invention are various and include all applications where movie generation of volume-rendered images comprising e.g. heart data is desired.

The segmentation unit, calculation unit, motion creation unit may be any unit normally used for performing the involved tasks, e.g. a hardware, such as a processor with a memory. The processor may be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

In an embodiment the apparatus is comprised in a medical workstation or medical system, such as a Computed Tomography (CT) system, Magnetic Resonance Imaging (MRI) System or Ultrasound Imaging (US) system.

In an embodiment the computer-readable medium comprises code segments arranged, when run by an apparatus having computer-processing properties, for performing all of the method steps or functionalities of the apparatus defined in some embodiments.

The invention may be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor.

Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. An apparatus for processing of an image dataset comprising an object, said apparatus comprising:
a segmentation unit comprising one or more processors configured to perform image segmentation of said object,
a calculation unit comprising the one or more processors configured to:
calculate a first location defining a first start point of a first sub object of said object;
calculate a second location defining a first end point of said first sub object;
calculate a third location defining a center point of said image dataset;
calculate a first projected start point by projecting said first start point onto a projection surface of a virtual sphere using said center point, wherein the virtual sphere is sized such that the segmented said object fits within the virtual sphere and said center point is the center point of the virtual sphere;
calculate a first projected end point by projecting said first end point onto the projection surface of the virtual sphere using said center point; and
calculate a path between said first projected start point and said first projected end point along the projection surface of the virtual sphere;
a movie creation unit comprising the one or more processors configured to calculate at least two successive images of the segmented said object fitted within the virtual sphere from said path with a virtual camera moving on said path between said first projected start point and said first projected end point along the projection surface of the virtual sphere, wherein each of said images of the segmented said object fitted within the virtual sphere has a projection plane oriented by a vector normal to the projection plane and the projection plane further oriented by the vector extending from a point on said path to the center point of the virtual sphere.

2. The apparatus according to claim 1, wherein said path is a closed loop path.

3. The apparatus according to claim 1, wherein said calculation unit is further configured to calculate a first intermediate point located between said first start point and said first end point, and wherein said calculation unit is configured to:
calculate a projected intermediate point by projecting said intermediate point onto the projection surface of the virtual sphere using said center point, and
calculate a path along the surface of the virtual sphere between said first projected start point and said first projected end point via said projected intermediate point.

4. The apparatus according to claim 3, wherein said intermediate point is located on a centerline of said sub object.

5. The apparatus according to claim 3, wherein said intermediate point is located on a straight line between said first start point and said first end point.

6. The apparatus according to claim 1, wherein said end point is an averaged end point.

7. The apparatus according to claim 1, wherein said object is a heart and said first sub object is a coronary artery.

8. The apparatus according to claim 1, wherein said calculation unit is further configured to:
calculate a first location defining a second start point of a second sub object of said object;
calculate a second location defining a second end point of said second sub object; and
calculate a second projected start point by projecting said second start point onto the projection surface of the virtual sphere using said center point,
calculate a second projected end point by projecting said second end point onto the projection surface of the virtual sphere using said center point,
calculate a path along the projection surface of the virtual sphere between said first projected start point, said first projected end point, said second projected start point, and said second projected end point.

9. The apparatus according to claim 1, wherein a direction of said path is according to a direction from the first start point to the first end point.

10. The apparatus according to claim 1, further comprising an input unit comprising the one or more processors configured to receive information regarding a preferred fly-path from a user, and wherein the calculation unit is configured to:
  calculate at least one additional point from the user-defined fly-path in relation to the first start point and first end point based on said information; and
  calculate a path based on said first projected start point, first projected end point, center point and the relation of said at least one additional point with respect to the position of the first start point and first end point.

11. Use of the apparatus according to claim 1 for facilitating diagnosis or subsequent treatment or surgical treatment of an anatomical structure in a patient.

12. The apparatus of claim 1, wherein the image data is generated by at least one imaging modality selected from a group comprising of: computed tomography (CT), magnetic resonance (MR), and ultrasound (US).

13. A method for processing of an image dataset comprising an object, said method comprising:
  performing image segmentation of said object,
  calculating a first location defining a first start point of a first sub object of said object,
  calculating a second location defining an first end point of said first sub object,
  calculating, with a processor, a third location defining a center point of said image dataset,
  calculating a first projected start point by projecting said first start point onto a projection surface of a virtual sphere using said center point, wherein the virtual sphere is sized such that the segmented said objects fits within the virtual sphere and said center point is the center point of the virtual sphere,
  calculating a first projected end point by projecting said first end point onto the projection surface of the virtual sphere using said center point,
  calculating a path along the projection surface of the virtual sphere between said first projected start point and said first projected end point,
  calculating at least two successive images of the segmented said objects fitted within the virtual sphere according to a virtual camera moving on the surface of the virtual sphere along said path, wherein each of said images has a projection plane oriented by a vector normal to the projection plane and the projection plane further oriented by the vector extending from a point on said path along the projection surface of the virtual sphere to the center point of the virtual sphere.

14. A memory having embodied thereon a computer program for processing by a processor, said computer program comprising:
  a segmentation code segment configured to perform image segmentation of an object being comprised in an image dataset,
  a calculation code segment configured to:
    calculate a first location defining a first start point of a first sub object of said object;
    calculate a second location defining an first end point of said first sub object;
    calculate a third location defining a center point of said image dataset;
    calculate a first projected start point by projecting said first start point onto a projection surface of a virtual sphere using said center point, wherein the virtual sphere is sized such that the segmented said object fits within the virtual sphere and said center point is the center point of the virtual sphere;
    calculate a first projected end point by projecting said first end point onto the projection surface of the virtual sphere using said center point; and
    calculate a path between said first projected start point and said first projected end point along the projection surface of the virtual sphere, and
  a movie creation code segment configured to calculate at least two successive images of the segmented said object fitted within the virtual sphere according to a virtual camera moving on said path along the projection surface of the virtual sphere, wherein each of said images has a projection plane oriented by a normal vector to the projection plane and the projection plane further oriented by the normal vector extending from a point on said path to the center point of the virtual sphere.

* * * * *